(12) United States Patent
Burchtorf et al.

(10) Patent No.: US 11,332,395 B2
(45) Date of Patent: May 17, 2022

(54) SANITARY FOOD WASHING STAGE IN FOOD PRODUCTION

(71) Applicant: CHEMTREAT, INC., Glen Allen, VA (US)

(72) Inventors: John K. Burchtorf, Boise, ID (US); William Henderson, Richmond, VA (US); Daniel Marsh, Boise, ID (US)

(73) Assignee: CHEMTREAT, INC., Glen Allen, VA (US)

( * ) Notice: Subject to any disclaimer, the term of this patent is extended or adjusted under 35 U.S.C. 154(b) by 0 days.

(21) Appl. No.: 17/237,764

(22) Filed: Apr. 22, 2021

(65) Prior Publication Data

US 2021/0238070 A1 Aug. 5, 2021

Related U.S. Application Data

(63) Continuation of application No. PCT/US2020/051794, filed on Sep. 21, 2020.

(60) Provisional application No. 62/903,367, filed on Sep. 20, 2019.

(51) Int. Cl.

| | | |
|---|---|---|
| *C02F 1/72* | (2006.01) |
| *A23L 5/20* | (2016.01) |
| *A23L 19/10* | (2016.01) |
| *A01N 37/16* | (2006.01) |
| *A01N 59/00* | (2006.01) |
| *A23N 12/02* | (2006.01) |
| *C02F 1/50* | (2006.01) |
| *C02F 1/66* | (2006.01) |
| *C02F 1/00* | (2006.01) |
| *C02F 103/32* | (2006.01) |

(52) U.S. Cl.
CPC .............. *C02F 1/722* (2013.01); *A01N 37/16* (2013.01); *A01N 59/00* (2013.01); *A23L 5/20* (2016.08); *A23L 19/10* (2016.08); *A23N 12/023* (2013.01); *C02F 1/50* (2013.01); *C02F 1/66* (2013.01); *A23V 2002/00* (2013.01); *C02F 2001/007* (2013.01); *C02F 2103/32* (2013.01); *C02F 2301/046* (2013.01); *C02F 2303/04* (2013.01); *C02F 2305/04* (2013.01)

(58) Field of Classification Search
CPC ...................................................... C02F 1/722
See application file for complete search history.

(56) References Cited

U.S. PATENT DOCUMENTS

| 5,683,724 | A | 11/1997 | Hei et al. |
| 2005/0161636 | A1 | 7/2005 | Man et al. |
| 2009/0324790 | A1 | 12/2009 | Hilgren et al. |

(Continued)

OTHER PUBLICATIONS

International Sugar Journal, State of the art wastewater treatment for Sugar Factory Osijek in Croatia, Sep. 2017 vol. CXIX Issue #1425.*

(Continued)

*Primary Examiner* — Peter Keyworth
(74) *Attorney, Agent, or Firm* — Oliff PLC

(57) ABSTRACT

Methods and systems are described for providing improved food processing systems by treating wash water in a wash stage of the food processing system with a biocide. Sufficient biocide may be added to significantly reduce the levels of bacteria in the wash stage, which can prevent problems associated with bacteria in downstream processes.

16 Claims, 1 Drawing Sheet

(56) References Cited

U.S. PATENT DOCUMENTS

2015/0159230 A1 6/2015 Van Haute et al.
2017/0158537 A1 6/2017 Buschmann

OTHER PUBLICATIONS

Dec. 17, 2020 International Search Report issued in International Patent Application No. PCT/US2020/051794.
Dec. 17, 2020 Written Opinion of the International Searching Authority issued in International Patent Application No. PCT/US2020/051794.

* cited by examiner

SANITARY FOOD WASHING STAGE IN FOOD PRODUCTION

CROSS-REFERENCE TO RELATED APPLICATION

This application is a continuation application of PCT Application No. PCT/US2020/051794, filed on Sep. 21, 2020, which claims the earlier filing date benefit of U.S. Provisional Application No. 62/903,367, filed Sep. 20, 2019. The disclosures of these applications are incorporated herein by reference in their entireties.

TECHNICAL FIELD

This disclosure relates generally to systems and methods that create a sanitary washing stage in food processing, and in particular for processing root vegetables such as sugar beets. The embodiments are described in connection with sugar beets but it would be understood that the invention could be applied to other root vegetables or other foods that require washing during production processes.

BACKGROUND

Flume systems in a sugar beet processing factory are designed to transport and clean sugar beets prior to additional processing. Beet piles contain soil, rocks, tops, chips, and other undesirable foreign material. The beets themselves are often coated with soil or dirt after they are extracted from the ground. The beets need to be cleaned in the flume before entering the process where they are sliced into cossettes prior to entering a diffuser where sugar is extracted from the beets. Some factories have incorporated a "dry beet handling" system in the beet handling area to remove a significant portion of the rocks, tops, foreign objects, and loose dirt prior to the flume.

Along with dirt, rocks, and debris, a significant amount of sugar accumulates in the flume system from diffusion into the water. Bacteria becomes a major issue in these systems and can cause serious issues if not controlled because sugar provides a food source for bacteria. Most factories have implemented lime addition to control bacteria levels/activity in the flume. A typical range for control of pH in the flume is 11.0-12.5. In larger factories, this equates to 20-30 tons per day (or more) of lime addition. pH control improves settling in the flume clarifier, and is believed to reduce bacterial growth. As the sugar beet processing campaign progresses, total dissolved solids, sugar content (8%+), fines, organic matter, and non-settleable solids accumulate and increase the viscosity of the flume water. This increased viscosity combined with low temperatures (3-5° C.) of the flume water creates an environment where solids tend to settle out of suspension and cause challenges.

SUMMARY

In connection with this disclosure, the inventors have discovered that in addition to the above-identified problems caused by bacteria in the wash stage, when the bacteria levels reach a certain level, a high loading of bacteria can be carried with the food (e.g., in water that is carried with the food) to downstream production processes, and can inoculate water in the downstream stages so the bacteria grows and reproduces at the downstream stages, which causes significant problems. This disclosure relates to improved methods and systems for treating water that washes food upstream of production processes by operating at least a portion of the wash stage (e.g., a flume) in a sanitary or sanitary-like condition so that bacterial levels are reduced to a level that prevents or substantially reduces downstream inoculation.

In one aspect, this disclosure provides a method for processing food products that includes treating wash water used to wash the food products with a biocide treatment, washing the food products with the wash water in a wash stage, recycling the wash water that is used to wash the food products back to the wash stage, and, after washing the food products, further processing the food products in a downstream processing stage. A portion of the wash water can be carried over to the downstream processing stage.

In another aspect, this disclosure provides a system for processing food products that are used in sugar production. The system includes a wash stage in which wash water contacts the food products and removes dirt and contaminants from the food products, and the wash stage includes a water recycle loop that receives the wash water and has a settling area to allow solids in the water to settle before the water is recycled to wash the food products. The wash water in the wash stage is subjected to a biocide treatment. The system also includes a processing stage downstream from the wash stage in which the food products are further processed to produce sugar.

DETAILED DESCRIPTION OF EMBODIMENTS

The systems and methods described herein use a biocide treatment that can be added to the wash stage of a food production process to reduce bacteria to manageable levels. The embodiment described below in connection with FIGS. 1A-1B is a sugar beet factory, but the same treatment processes can be used with other food products that are washed before a production process.

Figure 1A:
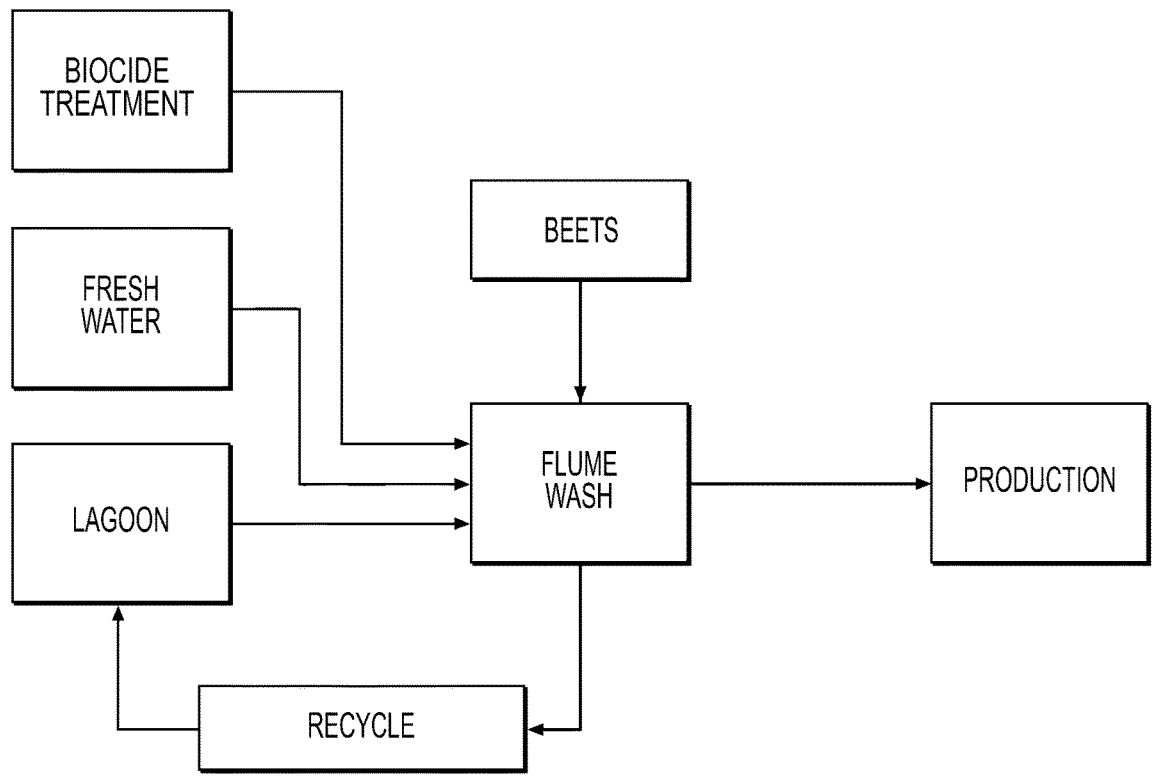
FIG. 1A is a schematic diagram of a wash stage in a beet sugar factory.
Figure 1B:
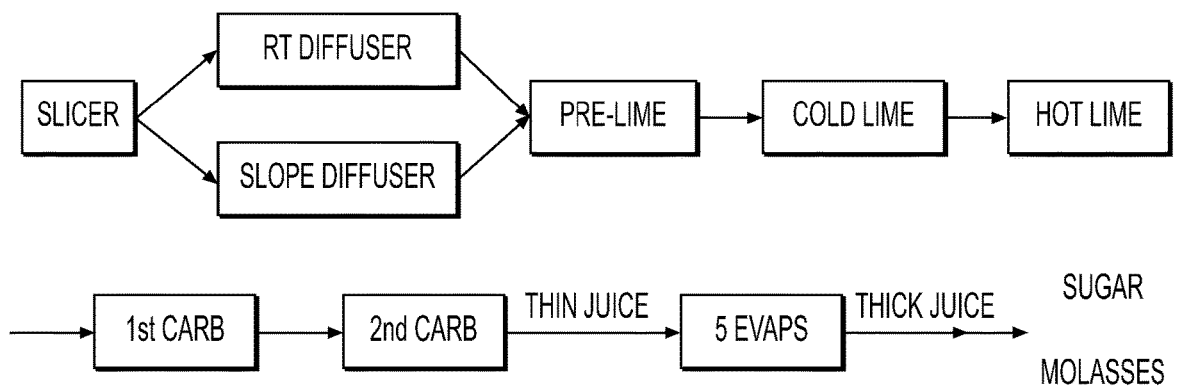
FIG. 1B is a schematic diagram of a beet sugar processing system.

The water use and recovery system of a flume stage in a sugar beet factory is shown schematically in FIG. 1A. As can be seen, the vegetables are introduced and washed with water before being further processed, e.g., to produce sugar. The flume wash typically includes a stream of water that transports the beets while washing them. The temperature of the wash water can be in a range of from 1 to 25° C., from 2 to 15° C., or from 3 to 5° C., for example. The stream normally terminates at a beet washer tank where agitation and a series of beater bars remove dirt from the beets. The beets are typically then conveyed onto a spray table where the beets are sprayed with water prior to being sent to the slicer. The flume system is a closed system in which a vast majority of the wash water is recycled (e.g., at least 90 wt. % or at least 95 wt. % of the wash water can be recycled to the wash stage), with primary water loss occurring from water remaining on the beets that is carried into the process stages (e.g., less than 5 wt. % of the wash water is carried over, or less than 1 wt. %, or even less than 0.1 wt. %). Because it is a closed system, suspended solids concentrate-up in the flume over time. A flume clarifier and/or a pond or lagoon can allow suspended solids to settle before recirculating water back to the flume to wash more beets. The biocide can be added to the water at one or more locations in the flume stage, including adding it to the spray table water, adding it to a wash tank, adding it to the inlet of the clarifier, or adding it to the effluent of the clarifier, for example.

A typical sugar production process, downstream of the flume system, is illustrated in connection with FIG. 1B. Once the beets arrive they are sent to the slicer where they are sliced into cossettes that may resemble either ruffled potato chips, or shoestring potatoes depending on beet quality at the time. From the slicer they are sent to a diffuser to extract the sugar. After the diffusers, the water contains solid particles, dissolved sugars and dissolved non-sugars. The sugar content is around 14-18% in solution and 85-92 purity. In order to remove the non-sugars, such as lignin or tannin, lime is added to raise the pH to around 11-12 which helps facilitate coagulation of particulates and non-sugars. After the first lime addition, the juice is heated and more lime is added to react any non-sugars that remain dissolved. At the carbonation stages, the pH is dropped to 9.8-10.5 by adding $CO_2$ to help solids precipitate. From the Dorr or clarifier overflow after $1^{st}$ carbonation, the juice is sent to a $2^{nd}$ carbonation step and subsequent steps, as needed. After filtration, the juice is referred to as "thin juice". It is a light amber color and is typically around 14-18% sugar in solution at around 88-92% purity. Thin juice goes through five to seven evaporator stages, which concentrate the juice into "thick" juice. The "thick juice" is high in dissolved sugar around 60-65%. Thick juice and a mixture of syrup returns from the spinners, are blended in the standard liquor tank, filtered, and sent to the vacuum pan to crystallize into white sugar. That portion of the syrup that can no longer be crystallized into sugar is sent to the molasses tanks. Separators or MD (molasses desugarization) processes may help remove sugar from the molasses with remaining liquor being used for animal feed or dust control. Cane molasses is marketed for use by consumers or consumer products.

In connection with this disclosure, the inventors performed microbiological testing of flume water and mud in sugar beet production facilities and found that the high pH levels (e.g. 11-12.5) act as a biostat that are effective at preventing bacteria growth or even somewhat reducing bacteria growth. However, maintaining these high pH levels is not effective as a biocide that kills the bacteria, so a significant amount of bacteria is present in the wash water even if a high pH is maintained in the flume. It is believed that the high loading of bacteria carries into the cossette mixer and diffuser (two post-flume parts of the process) with the wet beets, and thus can inoculate downstream processes. As bacteria enters the processing environment with higher temperatures (e.g., temperatures can be at least 50° C., such as from 50-90° C., or 60-75° C., for example), they become very active and cause sugar loss, invert, lactic acid formation, purity issues, etc. Additionally, other undesirable materials that carry over from the flume into the process can increase wear on processing equipment and cause processing challenges such as infections, decreased sugar purity, and overall increased processing costs and time for factory operations.

Based on these issues, in particular the potential for inoculation, it is believed that the treatment methods described herein can be useful in food production systems where (i) the wash stage is a closed system where the wash water is recycled and re-used to wash the food, (ii) some wash water is carried into downstream food production processes, and/or (iii) the downstream food production processes occur at a much higher temperature than the wash water in the wash stage (e.g., at least 20° C. warmer, at least 40° C. warmer, or from 50° C.-85° C. warmer).

As shown in FIG. 1A, the biocide treatment can be added to the washing stage. The biocide treatment can include one or more biocides including oxidizing biocides. Examples include chlorine dioxide, hydrogen peroxide, a peroxyacid (e.g., peracetic acid), and ozone. These biocides can be added in liquid or gas form, for example. In addition or alternatively, UV light may be used as a biocide treatment in the wash stage. The biocide treatment preferably does not have a measurable effect on the pH of the water.

In addition to a biocide, a surfactant may also be added to the wash stage, which may improve results. In some aspects, a surfactant can be selected and dosed at levels so that it does not deteriorate the water quality of the clarifier (i.e., does not interfere with the clarification of the water) or even so that it improves the water quality of the clarifier. The surfactant can be added separately from the biocide or together as a composition that includes both the surfactant and biocide.

A sufficient amount of biocide treatment can be added to the portion of the wash stage to reduce the level of bacteria to manageable levels to effectively prevent or substantially reduce downstream inoculation from wash water that is carried over with the food as it is further processed. As one metric, a sufficient amount of biocide can be added to the wash stage to reduce bacteria levels in the wash stage to be less than $10^4$ CFU/ml, less than $10^3$ CFU/ml, or from 10 to $10^2$ CFU/ml, for example. As another metric, the amount of biocide added to the wash water can be effective to reduce bacterial levels by at least 25%, at least 50%, at least 75%, or at least 90% as compared to a like process in which no biocide is added to the wash stage. As yet another metric, a sufficient amount of biocide can be added to at least a portion of the wash stage so that the water in the wash stage exhibits an ORP in the range of from 25 mV to 500 mV, in particular at least 50 mV, at least 100 mV, or at least 200 mV. These ORP values can be maintained in the water for at least 30 minutes, and up to 5 hours. Where oxidizing biocides are used they can be added so that the wash water has amounts of the biocide ranging from 0.2 to 1000 ppm, from 0.5 to 500 ppm, from 5 ppm to 400 ppm, from 20 ppm to 300 ppm, from 40 ppm to 250 ppm, or from 50 ppm to 200 ppm. Where the biocide is hydrogen peroxide or peroxyacids, the aforementioned ranges within 20 ppm to 300 ppm may be preferred depending on the system.

The amount of biocide, and optionally surfactant(s), will depend on the particular system, but should be added in amounts that will have a significant effect on the bacteria levels in the water. Also, demand for the biocide will be lowest at the start of campaign and will gradually increase as the campaign progresses as bacteria builds up, and thus the amount of biocide that is added to the system can be increased over time.

The biocide and, optionally, the surfactant can be added to the washing stage continuously, periodically, or intermittently. For example, the biocide can be added periodically at intervals in the range of from 10 minutes to 4 hours, at least 30 minutes to 2 hours, or at least 40 minutes to one hour. The biocide treatment can also be added in response to sensor information, e.g., in response to a measured concentration of biocide in the wash stage dropping below a predetermined threshold, in response to the ORP in the wash stage dropping below a threshold value, or in response to a measure of the bacteria levels in the wash stage or in the downstream processes exceeding a threshold level. The biocide treatment can be added automatically in response to such sensor information, e.g., by using a control system that includes the sensors, a controller with a processor (e.g., a CPU) that receives information from the sensors, a memory, and valves and/or pumps in communication with the controller to dispense the biocide treatment if the controller determines that a predetermined condition occurs (e.g., either a time for regular treatment periods or a threshold event).

Lime and/or another pH adjusting agent can still be added to the water in addition to the biocide. Lime can be added to the flume water after the clarifier, for example. Due to the addition of biocide, it is believed that significantly less lime will be needed to operate the flume at the desired pH, and that it is possible that lower water pH values may be feasible (e.g., 8.0-11.0, 8.0-10.0, or 9.0-10.0).

The biocide treatment may eliminate enough bacteria and/or organic contaminants to provide one or more of the following benefits:
1) Reduce lime addition to the flume without affecting settling;
2) Reduce bacteria loading in the wash stage;
3) Improve cleanliness of the vegetables entering the process;
4) Reduce demand for biocides that are used in the downstream production processes, such as ABS, Beta-Hops, Dextranase and Glutaraldehyde which are used in the diffuser stage;
5) Improve purity of raw juice and reduce sugar loss by preventing invert conditions in which sugar is transformed into other polysaccharides;
6) Improve settling and filtration of downstream processes ($1^{st}$ carb, second filters)
7) Reduce ammonia and other environmental contaminants which are sometimes added in the processing to reduce bacteria (e.g., ammonium bisulfite is sometimes added to downstream processing stages);
8) Reduce solids loading of beet handling, solids removal cost, etc., e.g., primarily due to significant reductions in lime use;
9) Improve settling in ponds/lagoons due to a reduction in the water density and viscosity.

EXAMPLES

Example 1—Hydrogen Peroxide Decay Test in Flume Spray Table Water

Water samples were taken from the spray table of a sugar beet factory. The samples had an initial pH of 6.3 and temperature of 60° F. The samples were treated with hydrogen peroxide in the amounts shown in Table 1 below at time 0. The hydrogen peroxide concentration was measured periodically over a 60 minute period. The oxidation-reduction potential (ORP) was measured over the same period. The results are shown in Table 1 below.

TABLE 1

| | Time (min) | | | | |
|---|---|---|---|---|---|
| | 0 | 5 | 30 | 45 | 60 |
| H2O2 (ppm) | 60 | 50 | 5 | 0.5 | <0.5 |
| ORP (mV) | 162 | 216 | 220 | 231 | ND |
| H2O2 (ppm) | 120 | >100 | 15 | 2 | 1 |
| ORP (mV) | 162 | 242 | 215 | 226 | ND |
| H2O2 (ppm) | 180 | >100 | 25 | 5 | 3 |
| ORP (mV) | 162 | 256 | 217 | 222 | ND |

Example 2—Hydrogen Peroxide Decay Test in Flume Return Water

Water samples were taken from the flume return (clarifier inlet) in a sugar beet factory. The samples had an initial pH of 6.4 and temperature of 62° F. The samples were treated with hydrogen peroxide in the amounts shown in Table 2 below at time 0. The hydrogen peroxide concentration was measured periodically over a 60 minute period. The oxidation-reduction potential (ORP) was measured over the same period. The results are shown in Table 2 below.

TABLE 2

| | Time (min) | | | | |
|---|---|---|---|---|---|
| | 0 | 5 | 30 | 45 | 60 |
| H2O2 (ppm) | 60 | 50 | 3 | 0.5 | 0 |
| ORP (mV) | 170 | 214 | 211 | 215 | ND |
| H2O2 (ppm) | 120 | >100 | 10 | 3 | <0.5 |
| ORP (mV) | 170 | 230 | 220 | 222 | ND |
| H2O2 (ppm) | 180 | >100 | 25 | 5 | 1 |
| ORP (mV) | 170 | 240 | 225 | 227 | ND |

Examples 1 and 2 demonstrate that, with initial biocide doses of 60, 120, or 180 ppm, at least a residual amount of biocide can be maintained in the flume water over a time period of from about 45-60 minutes. The data also shows that the ORP was increased in all treated samples and remained elevated for the test periods, which indicates that the water is able to kill bacteria.

Another observation from Examples 1 and 2 is that the initial pH at the clarifier inlet is the same as initial pH at the spray table despite lime slurry being added to the clarifier. This, together with the fact that the pH values are low, indicate that anaerobic bacteria may be offsetting the lime addition. Another sample collected from the clarifier weir (effluent) also had an initial pH of 6.4 and an ORP of −52 mV, which also suggests anaerobic conditions.

Although only a few embodiments have been described in detail above, those skilled in the art will readily appreciate that many modifications are possible in the example embodiments without materially departing from the disclosed embodiments. Accordingly, all such modifications are intended to be included within the scope of this disclosure as defined in the following claims.

What is claimed is:

1. A method for treating wash water that is used in a wash stage of a sugar production process in which food products are processed to make sugar, wherein the wash stage includes a loop in which (i) the wash water washes the food products to remove dirt and contaminants from the food products, (ii) the wash water is then sent to a settling area to allow solids in the wash water to settle, and (iii) the wash water is then recycled to wash the food products, wherein the pH of the wash water in the loop is maintained in a range of from 9.0-12.5, the method comprising:
    treating the wash water with a sufficient amount of oxidizing biocide so that the wash water in the loop has a concentration of the oxidizing biocide in a range of 5 ppm to 1000 ppm, the oxidizing biocide being selected from one or more of the group consisting of chlorine dioxide, hydrogen peroxide, ozone, and a peroxyacid.

2. The method according to claim 1, further comprising treating the wash water with a surfactant.

3. The method according to claim 1, wherein the oxidizing biocide is a peroxyacid.

4. The method according to claim 1, wherein the oxidizing biocide is hydrogen peroxide.

5. The method according to claim 1, wherein the oxidizing biocide is peracetic acid, and the peracetic acid is combined with the wash water in amounts so that the wash water has a concentration of the peracetic acid in a range of from 20 to 300 ppm.

6. The method according to claim 1, wherein after the treatment with the oxidizing biocide, the wash water in the wash stage exhibits an ORP of at least 25 mV.

7. The method according to claim 1, wherein after the treatment with the oxidizing biocide, the wash water in the wash stage has bacteria levels of less than $10^4$ CFU/ml.

8. The method according to claim 1, wherein the pH of the wash water in the loop is maintained in a range of from 9.0 to 11.0.

9. The method according to claim 1, wherein the food products experience temperatures in at least one downstream processing stage, which is downstream of the wash stage in the sugar production process, that are at least 20° C. warmer than the wash water in the wash stage.

10. The method according to claim 9, wherein the food products experience temperatures in the at least one downstream processing stage that are at least 50° C.

11. The method according to claim 1, wherein at least 95 wt. % of the wash water is recycled in the wash stage.

12. The method according to claim 11, wherein less than 5 wt. % of the wash water is carried over to at least one downstream stage, which is downstream of the wash stage in the sugar production process.

13. The method according to claim 1, wherein after the addition of the oxidizing biocide, the wash water in the wash stage has bacteria levels of less than $10^3$ CFU/ml.

14. The method according to claim 1, wherein after the addition of the oxidizing biocide, the wash water in the wash stage has bacteria levels of less than 10 to $10^2$ CFU/ml.

15. The method according to claim 1, wherein the oxidizing biocide is added to the wash water periodically at intervals in the range of from 10 minutes to 4 hours.

16. The method according to claim 1, wherein the treating step includes adding the oxidizing biocide to the wash water in the loop, and wherein the oxidizing biocide that is added does not have a measurable effect on the pH that is maintained in the loop.

* * * * *